G. W. LAMBERT.
ANTISKID ATTACHMENT FOR VEHICLE TIRES.
APPLICATION FILED FEB. 10, 1917.

1,335,691. Patented Mar. 30, 1920.

G. W. Lambert
Inventor

By Geo. F. Kimmel
Attorney

UNITED STATES PATENT OFFICE.

GEORGE W. LAMBERT, OF SPANGLER, PENNSYLVANIA.

ANTISKID ATTACHMENT FOR VEHICLE-TIRES.

1,335,691. Specification of Letters Patent. Patented Mar. 30, 1920.

Application filed February 10, 1917. Serial No. 147,870.

*To all whom it may concern:*

Be it known that I, GEORGE W. LAMBERT, a citizen of the United States, and resident of Spangler, in the county of Cambria and State of Pennsylvania, have invented certain new and useful Improvements in Antiskid Attachments for Vehicle-Tires, of which the following is a specification.

This invention relates to vehicle tires and has more especial reference to an improved anti-skidding attachment therefor.

The dominant object of the invention is to provide an anti-skidding attachment adapted for arrangement over the tread portion of a vehicle tire, whereby, to prevent slipping of the same when traveling over slippery roadways and the like.

Another object of the invention is to provide an anti-skid attachment so constructed, as to permit the same to be readily placed over the tread portion of a vehicle tire and to prevent cutting of the fabric construction thereby, when the weight of the vehicle is directed thereonto or the same is shifted slightly longitudinally due to the driving engagement of the wheels with the ground.

It is also an object of the invention to provide novel calks removably arranged in the tread portion of the attachment, whereby, the same may be readily disengaged therefrom when worn or broken.

The improvements in the details and arrangement of parts will be apparent from an inspection of the accompanying drawings in connection with the specific description hereinafter contained and wherein the preferred embodiment of the invention is disclosed for imparting a full understanding of the same.

Figure 1:
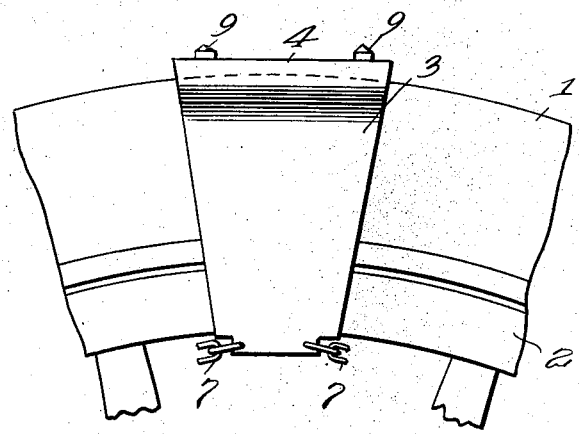
Figure 1 is a side elevation of my improved anti-skidding attachment as applied to a fragment of a vehicle tire.
Figure 2:
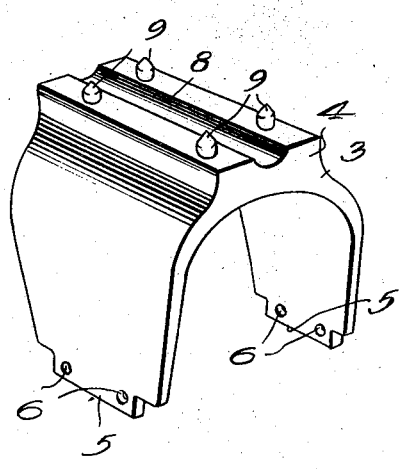
Fig. 2 is a perspective view of the same.
Figure 3:
Fig. 3 is a detail in perspective of one of the removable calks.

Referring more specifically to the drawings, wherein like reference numerals designate corresponding parts in the several views, it is to be noted, that I have shown by way of illustration, my improved antiskid attachment as applied over the tread portion of a pneumatic tire, which tire is designated by the numeral 1 and is supported upon the tread portion of the conventional type of vehicle wheel, designated by the numeral 2. With more especial reference to the present improvements, the improved anti-skid attachment may be stated to comprise a plate 3, which plate is of a shape complemental to the shape of the pneumatic tire 1 and has the outer or tread portion thereof thickened as at 4, which is formed with spaced flattened surfaces or portions, the purpose of which will be subsequently apparent. The opposite extremities of the plate 3 are slightly reduced as at 5 and have a plurality of openings 6 formed therein, whereby connection may be had with suitable fastening or securing chains 7, in order that the various anti-skid plates as arranged about the tread portion of the pneumatic tire 1 may be securely maintained in position thereover.

Within the outer face of the thickened portion 4 of the anti-skid plate 3, there is formed a longitudinally disposed channel 8, while upon the opposite sides thereof a plurality of screw threaded openings are arranged and have turned into engagement therewith a plurality of calks 9, the inner extremities of which are screw threaded at 10, while the outer extremities are sharpened to afford positive engagement with a roadway or the like. By turning the calks 9 into engagement with the screw threaded openings formed in the thickened tread portion 4 of the plate 3, it will be appreciated that the same may be readily removed therefrom when worn or broken, to permit the sharpening of the same or the replacing thereof.

In applying my improved anti-skid plates over the tread portion of the pneumatic tire 1, it is to be understood that any number of the same may be arranged thereabout, such as conditions or preference may dictate and that the same are secured in position over the tread portion through the medium of a plurality of chains, generally indicated by the numeral 7, which chains as hereinbefore stated are engaged with the various openings 6 formed in the reduced portions 5 of the opposite extremities of the said plates.

The longitudinally disposed channels 8, will prevent slipping of the vehicle tire and wheel transversely of a roadway or other surface, while the removable calks 9 will prevent slipping of the same longitudinally thereof, which slipping is frequently encountered due to the driving engagement of certain of the wheels of the vehicle with the said roadway or surface. Further, due to the provision of the flat engaging face of the tread portion of the attachment, it will be obvious that the same will positively engage the surface of a roadway or the like and as a consequence, will insure proper functioning of the calks 9 and the longitudinally disposed channels 8.

Due to the peculiar shape of the anti-skid plate 3, the side portions of which embrace the sides of the pneumatic tire 1 and portions of the wheel rim 2, it is also to be understood that cutting of the fabric construction of the tire will be prevented, when the weight of the vehicle is applied thereto and should for any reason, the same be shifted slightly longitudinally during the rotation of the wheels, especially those wheels which have driving engagement with the roadway, such as may be found upon motor driven vehicles and the like.

While I have herein illustrated and described the attachment embodying my invention, it is to be understood that the invention is not limited to the particular form and arrangement of the several parts, which may be modified within a wide range without departing from the essence of the invention, the construction shown and the description based thereon being intended to be taken in an illustrative rather than a limiting sense.

I claim:

An anti-skidding attachment for vehicle tires, comprising a plate having its inner portion shaped complemental to the transverse shape of the tire, and the outer intermediate portion of said plate being formed with a thickened tread provided with a medial longitudinal groove opening outwardly therethrough, the tread on opposite sides of the groove being formed with flat portions disposed in the same plane with each other, and a plurality of calks detachably engaged in said portions to project therefrom at spaced intervals longitudinally of the same.

In testimony whereof, I affix my signature hereto.

GEORGE W. LAMBERT.